United States Patent [19]
Deter et al.

[11] Patent Number: 5,822,022
[45] Date of Patent: Oct. 13, 1998

[54] VIDEO SYSTEM

[75] Inventors: Christhard Deter; Gerhard Hofmann; Dieter Hubrich, all of Gera, Germany

[73] Assignee: LDT GmbH & Co. Laser-Display-Technologie KG, Gera, Germany

[21] Appl. No.: 765,530
[22] PCT Filed: Apr. 26, 1996
[86] PCT No.: PCT/EP96/01750
 § 371 Date: Jan. 7, 1997
 § 102(e) Date: Jan. 7, 1997
[87] PCT Pub. No.: WO96/36183
 PCT Pub. Date: Nov. 14, 1996

[30] Foreign Application Priority Data

May 11, 1995 [DE] Germany ............... 195 17 356.2

[51] Int. Cl.⁶ .................................................. H04N 9/31
[52] U.S. Cl. .................. 348/750; 348/756; 348/203; 353/31
[58] Field of Search ............................ 348/750, 756, 348/758, 195–205, 760, 714, 715, 716, 717; 353/31; H04N 9/31, 5/74, 9/14, 3/08

[56] References Cited

U.S. PATENT DOCUMENTS

| 3,639,684 | 2/1972 | Levine . | |
| 4,931,874 | 6/1990 | Gillon et al. | 358/231 |
| 5,424,771 | 6/1995 | Yu | 348/203 |
| 5,614,961 | 3/1997 | Gibeau et al. | 348/750 |

FOREIGN PATENT DOCUMENTS

| OS 2657723 | of 1978 | Germany . |
| 29 38349C2 | of 1983 | Germany . |
| 33 06328C2 | of 1991 | Germany . |
| 40 15 020 | 11/1991 | Germany . |
| 41 39842A1 | of 1992 | Germany . |
| WO 94/18802 | 8/1994 | WIPO . |
| WO 95/03676 | 2/1995 | WIPO . |

*Primary Examiner*—Michael Lee
*Attorney, Agent, or Firm*—McAulay Nissen Goldberg Kiel & Hand, LLP

[57] ABSTRACT

In a video system for displaying a video picture composed of image points, whose color values and/or brightness values can be stored sequentially, according to a first set of parameters with predetermined parameter values containing number of lines, number of image points, line frequency and frame frequency as parameters, in an image storage which can be read out in accordance with a second set of parameters with different or identical parameter values for the parameters for displaying the stored video picture by means of a display device, the display device contains an individual light source which can be controlled in accordance with the color values and/or brightness values of the image points and whose light bundle can be projected onto a picture screen via an optical system, wherein the optical system has a raster scanning device by which the light bundle can be directed onto the picture screen on optional points within an image field for displaying the video picture of suitable dimensions and for which a raster control is provided for rastering the light bundle in accordance with the second set of parameters.

13 Claims, 4 Drawing Sheets

VIDEO SYSTEM

BACKGROUND OF THE INVENTION

1. Field of the Invention

The invention is directed to a video system for displaying a video picture composed of image points, whose color values and/or brightness values can be stored sequentially, according to a first set of parameters with predetermined parameter values containing number of lines, number of image points, line frequency and frame frequency as parameters, in an image storage which can be read out in accordance with a second set of parameters with different or identical parameter values for the parameters for displaying the stored video picture by means of a display device.

2. Description of the Related Art

Video systems of this type are known, e.g., from DE 29 38 349 A1. This reference describes a circuit arrangement for increasing resolution and for preventing flickering and an image storage with a video picture which is read out again at twice the speed.

Another application of image storages is known from DE 41 39 842 A1. This reference describes a video system by which the video picture is projected by means of lasers. Since the light intensity of the lasers is low, the received video picture is divided into partial areas in an image storage and these partial areas are imaged by means of different laser projectors.

Such image storages can also be used, for example, for converting from one standard to another, the aforementioned parameter sets being determined by the standard of the input signals and output signals. Including the high-resolution systems currently under development, the standards are substantially as follows: PAL, PAL PLUS, PAL 50-Hz frame frequency, PAL 100-Hz frame frequency, HDTV, HD-MAC, NTSC, and MUSE.

Generally, the possibility of storing video pictures with a given standard in an image storage and reading them out of the image storage for display with a different standard is very limited, since TV systems must use a picture tube adapted specifically to a standard and the number of lines as well as the aspect ratio of different systems relative to one another can change. This limitation becomes especially apparent in color television, since images can only be shown with a resolution determined by an aperture mask in the picture tube. This is also true for LCD projectors in which the density of image points is given by the structure of the LCD matrix to be projected.

Therefore, it has so far been impossible to construct a video system which can receive images in different standards and also display them in optional different standards.

OBJECT AND SUMMARY OF THE INVENTION

The primary object of the present invention is to provide a video system which receives signals of a video picture on the input side in accordance with a first set of parameters corresponding to a specified standard and displays this image according to a different, second set of parameters for displaying images which is determined by the same or by a different optional standard.

Proceeding from the prior art mentioned above, this object is met in that the display device contains an individual light source which can be controlled in accordance with the color values and/or brightness values of the image points and whose light bundle can be projected onto a picture screen via an optical system, wherein the optical system has a raster scanning device by which the light bundle can be directed onto the picture screen on optional points within an image field for displaying the video picture of suitable dimensions and for which a raster control is provided for rastering the light bundle in accordance with the second set of parameters.

The video system according to the invention differs from the prior art mentioned above in that every optional point on the picture screen can be illuminated for display by means of the light bundle so that, according to the invention, there is no limitation imposed, for example, by aperture masks or LCD matrices. Further, aperture masks for generating different colors can be dispensed with according to the invention because the rastered light bundle itself is controlled with respect to color and brightness. In order to generate the light bundle, the light source can be provided with three differently colored lasers, for example, which are controlled by RGB signals from the image storage and whose laser beams are unified by a mirror system to form a common light bundle.

Only one light bundle is provided so that there is no need, according to the invention, to divide the video picture into partial images which are displayed independently from one another. This substantially increases image quality without additional expenditure on adjusting means, since possible overlapping in the display of partial images is prevented through the use of an individual light bundle which scans the entire image field.

When the light bundle proceeding from the light source is very parallel, as is the case in the example given above with lasers, the picture screen for displaying can also be moved away from the raster scanning device as far as desired without a loss of sharpness. Thus, different image dimensions can be produced by this technique simply by adjusting the picture screen distance. This results in considerable flexibility with respect to displayable image dimensions and a video system of this kind can be manufactured for small as well as very large image sizes without an increase in technical expenditure.

Acousto-optical beam deflectors can be used, for instance, for the deflection of the light bundle. However, these deflection devices usually permit only very small deflection angles which means that the picture screen must be arranged at a considerable distance from the raster scanning device for correspondingly large images. For this reason, a preferred further development of the invention in which the raster scanning device has mirrors for deflecting the light bundle is more advantageous. Mirrors permit a substantially greater deflection angle so that the distance between the picture screen and the raster scanning device can be kept smaller than is possible with acousto-optical deflection.

The maximum possible deflection of a mirror is not limited so that different image sizes can be generated on the picture screen in a simple manner, that is, variable image sizes are made possible without adjusting the picture screen relative to the raster scanning device.

According to a preferred further development of the invention, the mirrors are constructed as rotating mirrors and/or swiveling mirrors.

Above all, rotating mirrors which are designed as polygon mirrors in which every side of the polygon is constructed as a mirror for scanning a line provide raster scanning with high deflection speed. When the polygon has a large number of sides, very high line frequencies are possible, since the line frequency is given by the revolutions per minute divided by the number of polygon sides. Further, due to their inertia, rotating mirrors ensure a very favorable synchronous running which can only be achieved in other types of deflection, e.g., acousto-optical deflection, by a commensurate expenditure on electronics.

For synchronization of lines, image storages are conventionally outfitted with their own generator which synchronizes the readout of the individual brightness values and color values from the image storage. However, in the indicated video system this would require a precise regulation of the position of the rotating mirror, which would result in increased expenditure on electronics. Therefore, it is provided in a further development of the invention that the image storage can be acted upon by synchronizing pulses for the start of the line and/or the start of the frame from the raster control for the readout of the video picture. In this further development of the invention, the synchronizing pulses can be obtained, e.g., from the actual rotation of the rotating mirror. In this case, the speed of the rotating mirror need not coincide exactly with the line frequency. Thus, the required technical expenditure is reduced as a result of this further development.

The synchronizing pulses can be obtained, e.g., inductively or by determining the time at which the light bundle, e.g., of a measurement laser or the light source itself, is reflected by a polygon surface.

In the case of very high frame frequencies and line frequencies, memory delays must also be taken into account for synchronization. Such delays may vary sharply from one case to another since the signal processing can differ widely for different numbers of image points and lines depending upon the input standard and output standard. This can cause problems with the synchronization of the read-out image. These problems are solved, according to a further development of the invention, in that the synchronizing pulses of the raster control can be generated prior in time to the start of each line which is given by the raster control by a time interval determined by the maximum memory delays and a delay circuit is provided for adapting the synchronizing signals to the actual delay time.

Due to this further development, the synchronizing pulses can be generated at a permanently defined time point with reference to the start of a line, which does not require any mechanical modifications for the picking up of synchronizing pulses by the movable mirrors for different operating conditions, e.g., when one of the parameter sets changes. On the other hand, the delay time is adjusted purely electronically by means of the delay circuit by a time determined by the parameter set representing the desired image processing in the image storage.

Widely different types of storages can be used as image storages, e.g., analog storages, one of which is provided for each color signal in the color video pictures. Such image storages store the images electrically, for instance, via an electron beam as charges on a plate, or optically on a persistent screen, wherein the plate or screen can be read out again as in a television camera by means of a second electron beam. The advantage in such image storages consists in that only a small expenditure is required for standards conversion. However, signal processing is possible only to a very limited degree, since such an image storage does not permit the application of special mathematical algorithms for changing the resolution for the second set of parameters without a large expenditure for signal conversion.

However, another preferred further development of the invention provides a digital storage in which the quantity of available storage locations is greater than or equal to the number of required storage locations for storing the color values and/or brightness values multiplied by the maximum number of displayable image points and the available storage locations are freely addressable by the color information and/or brightness information.

A digital image storage permits the use of various algorithms for image processing, above all when it is freely addressable. A video processor can be used for this purpose, this video processor working with the same storages and processing the images, e.g., by means of known algorithms for increasing or decreasing resolution, depending on whether or not the parameter set for display requires a higher or lower resolution than the parameter set for reading into the storage.

Digital storages are also obtainable at a lower cost and are more readily available than analog storages which are hardly in use anymore.

The prescription indicated above for selecting the number of storage locations limits the expenditure on the storage locations to those needed for the number of image points. Accordingly, better use can be made of the storage locations, e.g., compared with the storage of color values and/or brightness values in accordance with the address with respect to lines. In this case, the selected quantity of storage locations would have to be at least as great as the maximum number of lines multiplied by the maximum possible quantity of image points occurring per line, which generally requires a substantially larger storage area. On the other hand, when the digital storage is selected, the data are stored in the storage sequentially in accordance with the time sequence for display so that access time is very fast.

Since pulses for reading into and reading out of the image storage can also occur simultaneously in the indicated video system as a result of the different line frequencies of the first parameter set and second parameter set, problems arise due to the fact that a storage location in the storage can be addressed either via the address for reading in or those for reading out, but cannot be addressed simultaneously by both. Therefore, reading in and reading out should be synchronized with one another. A simple gate circuit which, e.g., prohibits reading in during readout, is not recommended for this purpose as data may be lost.

However, a preferred further development of the invention provides that the digital image storage has a priority circuit which, in the event of simultaneous addressing for storing in storage locations and for reading information out of storage locations, gives priority to the addressing for readout, temporarily stores the address for storage as well as the information to be stored, and only stores this information in the storage when the readout is concluded.

This circuit reserves priority for readout, which is advisable chiefly because, in the interest of achieving good image quality, no waiting periods for displaying an image point are permitted with rotating and swiveling mirrors because of the inertia. In this further development of the invention, the image information on the input side is also not lost because it is stored temporarily and is read into the image storage later, given available time at the conclusion of the readout. As will be made clear in the following with reference to an embodiment example, this can easily be realized by means of suitable electronic control equipment via a FIFO (first in, first out) storage for temporary storage.

The quality of the image display is advantageously increased by means of this feature without substantial expenditure.

According to another preferred further development of the invention, the quality of the image is increased in that an image processing device, in particular a video processor, is provided which interpolates the image points, in accordance with the second parameter set for display, from the brightness values and/or color values of the stored video picture when the number of image points and/or lines in the first parameter set is different than that in the second parameter set.

As a result of the image processing device, color values and brightness values from the first parameter set for displaying the video picture can also be transformed with the second parameter set. This is advantageous above all when the number of image points and/or the number of lines is different from that of the read-in image. By way of illustration, it will be assumed, for example, that the number of lines which are provided for display is twice that of the lines in the image which is read into the image storage. In this case, every second line in the image display could be interpolated from the preceding and following lines of the stored image with reference to the frame. Various algorithms are available for interpolating. Flexibility with respect to the various algorithms is achieved in that a video processor, for example, is used as an image processing device.

However, when there is a large number of image points, time problems can occur in currently available video processors, particularly when using a complex algorithm with many multiplications. This time problem can be avoided, according to a further development of the invention, in that a second storage or storage area is provided in which brightness values and/or color values which are interpolated by the image processing device are stored for readout for the display device. Thus, two storage areas are obtained for the image to be read in and read out, which increases the available time for the video processor to the time of an image and avoids storage access via auxiliary storage areas for carrying out intermediate calculations. Further, synchronization problems between data to be read in and data to be read out can be reduced when the storage or storage areas used for reading in and reading out are addressable independently from one another. Synchronization problems for data access by the video processor can be avoided by means of commercially available DMA (direct memory access) modules.

Further, the separation of storage areas for reading in and for reading out is advantageous in that a plurality of image processors to which different portions of the image are allocated for processing can work in parallel, which further reduces the available time for the transformation of the brightness values and/or color values for display.

According to a preferred further development of the invention, another possibility for reducing the image processing time consists in that more than one line can be read into the image processing device from the image storage, wherein the color values and/or brightness values of the lines which are read in can be subjected to analog summation in a weighted manner for generating a line for display. Based on such an analog circuit, multiplications are carried out very quickly, enabling higher rates for the display of an image than would be possible with digital interpolation by means of a video processor. As will be seen from an embodiment example hereinafter, different algorithms can also be used in a weighted summation of this kind. Accordingly, considerable flexibility is possible for different algorithms similar to that achieved in video processors.

The method of analog summation can be applied not only between lines, but also between image points of a line in that the color values and brightness values of a line can be summed in analog in a weighted manner from the image storage with respect to time, e.g., via an image point clock.

Alternatively, in a preferable further development of the invention, a low-pass filter is provided in the image processing device, this low-pass filter having a cutoff frequency which is given by a predetermined factor multiplied by the smallest product of the image point/line times the line frequency with respect to both sets of parameters.

According to this further development, the interpolation between color values and brightness values within a line is effected in analog by the low-pass filter. The parameter determining the interpolation is the cutoff frequency of the low-pass filter. The cutoff frequency is substantially given by the greater time per image point determined by the two sets of parameters. If the image point time for the read-in images is greater than that of the image points for display, the signal for the image point, which is a square pulse because of the digital image storage, must be smoothed via the low-pass filter for displaying the image point, since otherwise an ambiguity in hue which could result in flickering of the image results at the sharp flanks of the square pulses in the higher-resolution display.

On the other hand, if the duration of an image point for display is greater than that for a stored image point, the color values and brightness values for the display are not accurately fixed on the picture screen with respect to the location of the displayed image point. In either case, the greater of the durations per image point of both parameter sets is the favorable time constant of the low-pass filter. The factor indicated in this feature determines the degree of averaging over successive image points and accordingly fixes the interpolation between the image points. The factor accordingly allows a certain flexibility in the selection of the interpolation algorithm.

Most of all, this further development of the invention enables particularly fast image processing and resolution adaptation of the displayed images from the images which are read in. A further advantage consists in that high-frequency interference which can originate from the intermediate frequency, for example, is also filtered out by the low-pass filter. The displayed images are accordingly substantially free of interference.

Low-pass filters generally have capacitors which can charge during signal processing of the kind mentioned above so that the brightness may change somewhat from line to line. By including a black-level porch at the start of the line as information in the image storage, a shift of this kind can be compensated for automatically by interpolation. However, it is possible to economize on the additional storage space required for this purpose in that, with every line generated in this way, the black level is redefined prior to each displayed line by means of a clamping circuit, as is known from conventional television technique. Therefore, in a further development of the invention, a clamping circuit is provided downstream of the low-pass filter. This feature improves the display quality and reduces the required storage space.

The primaries for the color values can differ sharply in the images which are read into the image storage. For instance, the FCC standard for color definition diverges from that of the EBU standard, above all, for the color green. For this reason, it is advisable for adapting various standards, according to a preferred further development of the invention, to provide a circuit for color adaptation in the event of different signal definitions for color values and/or brightness values in the parameter sets for storing and readout. In this way, hue distortions due to different standards are also compensated for and the quality of the image display by the video system according to the invention is improved.

The invention will be explained more fully in the following in principle by way of example with reference to drawings.

DESCRIPTION OF THE PREFERRED EMBODIMENTS

Figure 1:
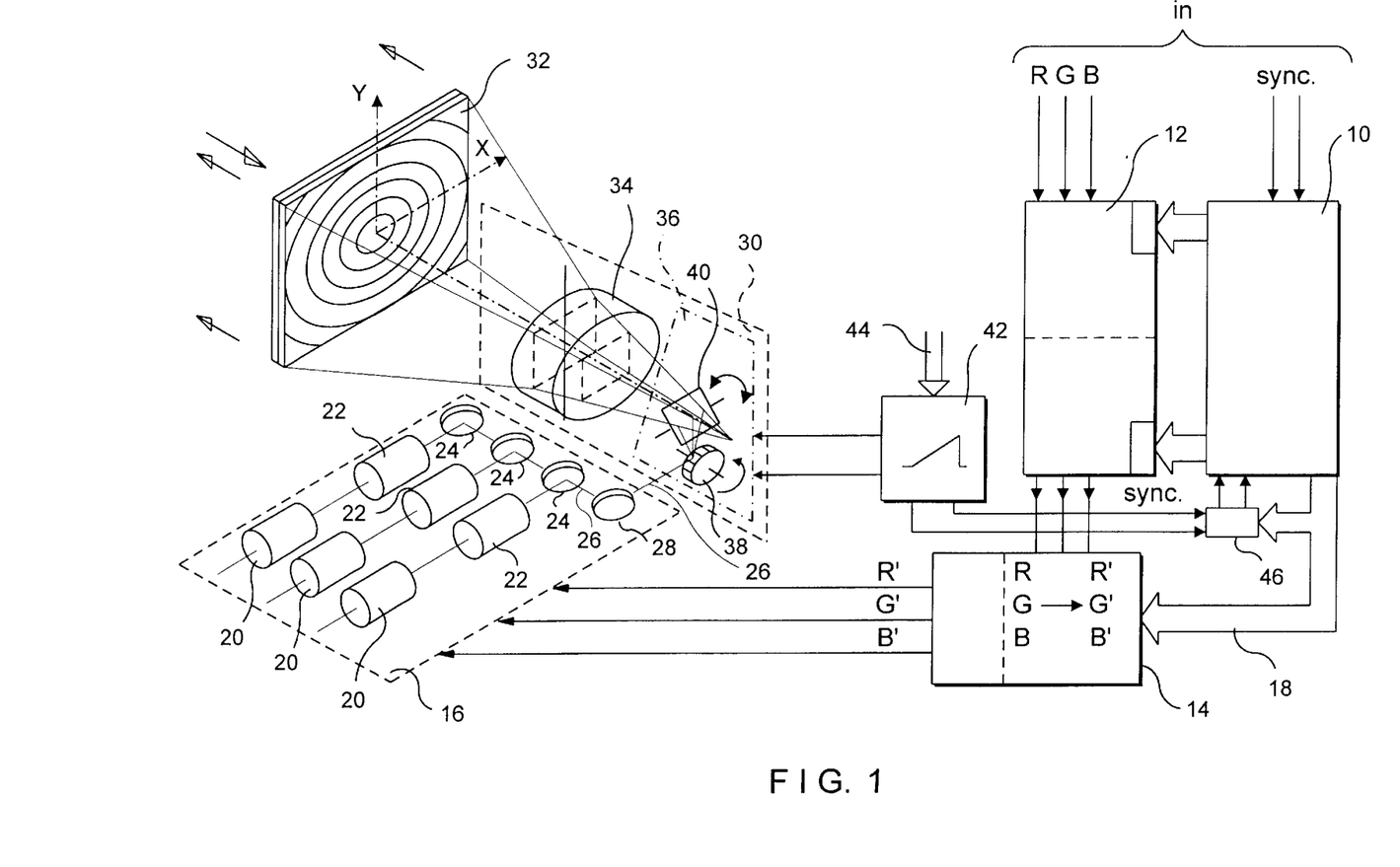
FIG. 1 shows a video system according to the invention with laser projection.

FIG. 1 shows a video system into which color value signals R, G, B and synchronizing signals are fed in accordance with a first set of parameters containing number of lines, number of image points, line frequency, frame frequency, and signal definition for color and brightness of the image points, This parameter set can be determined by a standard, for example, corresponding to PAL, PAL PLUS, PAL 50-Hz frame frequency, PAL 100-Hz frame frequency, HDTV, HD-MAC, NTSC, or MUSE. The synchronizing signals of the video picture are applied to the inputs of a system control circuit 10. The system control circuit 10 serves to generate, manage and prepare all control signals used in the video system according to FIG. 1 in accordance with separate sets for parameters for reading in and for displaying the video picture. For the storage of digitally converted RGB signals, it generates the storage addresses of a digital image storage 12 from the present synchronizing signals, the analog-to-digital-converted RGB signals being stored in its storage locations.

In FIG. 1, a dashed line is drawn through the center of the image storage 12 indicating that readout and read-in are effected separately with respect to the image storage 12.

For reading out of the image storage, the addresses are given by the system control circuit 10 in accordance with the second set of parameters for display. The RGB signals which can be used for display are present in analog form at the outputs of the image storage after the RGB signals digitally stored in the image storage 12 have been converted back to analog signals.

The analog RGB signals are applied to the inputs of a control device 14 which controls a light source 16 with respect to color and brightness. As a rule, the light source 16 will not have the same primaries as the transmitted RGB signals so that a matrix switching circuit is provided in the control device 14 for transforming the RGB signals to the primary colors R', G', B' of the light source 16. The required transformation matrix can vary depending on the standard since the RGB signals can be defined according to the primaries of 25 the FCC standard or EBU standard, for example. Therefore, the system control circuit 10 can adjust the components in the matrix switching circuit determining the matrix coefficients via a control line 18.

Further, the control device 14 also contains amplifiers and circuits for nonlinear rectification adapted to the light source 16, so that an optimum brightness quality and color quality can be achieved by the light source 16.

The light source 16 in the embodiment example contains three lasers 20 for red, green and blue. In the embodiment example, these lasers 20 are SKYLIGHT 400 series argon lasers and krypton lasers available from the firm COHERENT, in which the wavelengths of the lasers are selected at 647.1 nm for red, 514.5 nm for green and 458.0 nm for blue by means of BP 458 and BP 514, 5 filters available from Schott, Mainz, Germany. Since the light intensities of lasers of this type cannot change quickly enough, the lasers 20 are operated in continuous wave operation and their light intensity is controlled by modulators 22. The modulators 22 in this case are DKDP crystals which determine the light intensities via changes in polarity. The modulators are controlled directly by the signals R', G', B' supplied by the control device 14.

The light bundles exiting from the modulators are combined to form a common light bundle 26 via dichroic mirrors 24 and are reflected via a deflecting mirror 28 into an optical system 30 which is arranged downstream and which directs the light bundle 26 onto a picture screen 32. In the embodiment example of FIG. 1, the viewer is situated in the direction of the thin arrow. Thus, rear projection is used. However, the same principles used in the embodiment example in FIG. 1 can also be used for front projection.

Provided in the optical system 30 is a lens system 34 by which the light bundle 26 is projected onto the picture screen 32. The optical system 30 further contains a raster scanning device 36 which deflects the light bundle 26 onto the picture screen 32 in a framewise and linewise manner in order to generate a video picture. According to the invention, the raster scanning device is so designed that the light bundle 26 can be projected within a given picture field on optional points of the picture screen 32. A polygon mirror 38 is provided for linewise deflection on the picture screen 32 in the x direction shown in FIG. 1, while the framewise deflection is carried out in the y direction shown in the drawing by means of a swiveling mirror 40.

The polygon mirror 38 and swiveling mirror 40 are controlled by signals from a raster control 42.The raster control 42 establishes not only the rate of revolutions and the deflection of the swiveling mirror, but also the amplitude of the swiveling mirror 40 in order to take into account picture aspect ratios such as 3 to 4 or 9 to 16 in different standards without having to blank image points. This economizes on laser output.

In order to adjust the amplitudes and frequencies for polygon mirrors and swiveling mirrors, the raster control 42 receives, via control lines 44, the corresponding signals which are outputted by the system control circuit 10 in accordance with the second set of parameters. In order to dispense with costly regulating devices, the synchronizing pulses for the image to be displayed are not generated separately and then readjusted in a suitable manner, but rather are obtained by the raster control 42 from the positions of the polygon mirror and swiveling mirror detected by the raster control 42. For example, this sensing can be effected inductively via magnets at the polygon mirror 38 or swiveling mirror 40. However, an additional laser could also be directed onto one of the polygon surfaces and recorded at a determined position of its reflected light bundle by means of a light-sensitive detector in order to detect the position of the polygon mirror and obtain therefrom a synchronizing signal for the start of the line.

The synchronizing signal for the line which is obtained in this way is guided from the raster control 42 to the system control circuit 10 in order to control the image storage 12. In so doing, the operating times of the image storage 12 are taken into account in that the synchronizing signals are outputted at a specified time interval prior to the start of the line. However, memory delays of the image storage 12 can vary in length depending on whether or not an algorithm is required for generating intermediate lines and depending on how time-consuming this is. Therefore, the synchronizing signals are outputted prior to the start of the line by a fixed time interval which is greater than the longest possible memory delay in the image storage and the synchronizing signals are then delayed via a delay circuit 46 whose delay time is adjusted by the system control circuit 10 for the delay actually required.

After passing through the delay circuit 46, the synchronizing signals are fed to the system control circuit 10 where the addresses for the readout of the image storage are generated, e.g., in that a counter is counted up by the synchronizing signals.

In the example shown in FIG. 1, special requirements are imposed on the image storage with respect to the time at which the color value signals of image points are present at its outputs and, in particular, for the data processing if a high-quality display is to be made possible up to the high frequencies of 20 MHz required in the HDTV standard. The construction of such image storages will be explained in more detail with reference to the following figures.

Figure 2:
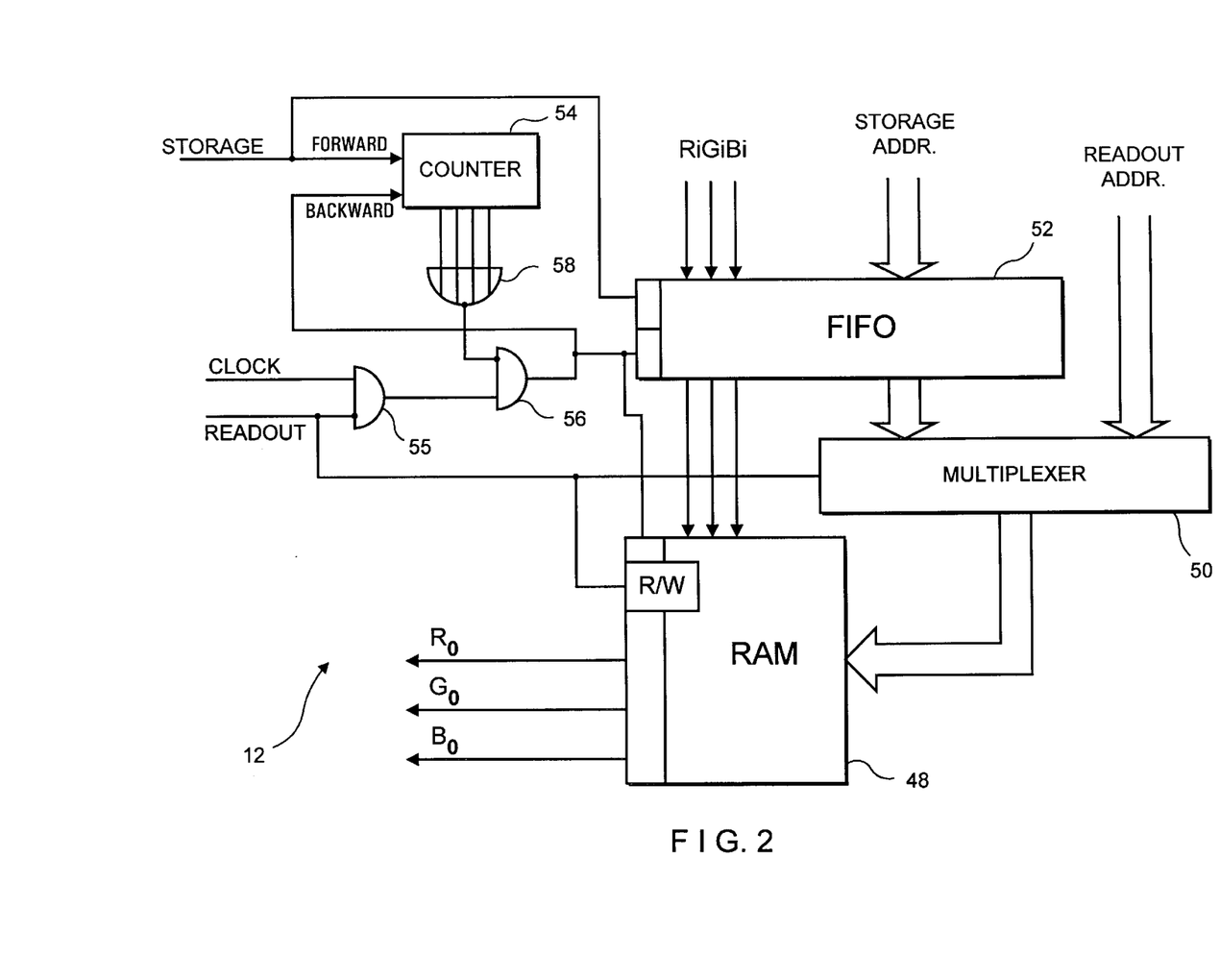
FIG. 2 shows a circuit for an image storage which can be used in a video system according to FIG. 1.

FIG. 2 shows an image storage 12 in which the digitally converted color value signals $R_i$, $G_i$, $B_i$ are stored in a RAM (random-access memory) 48 and at whose outputs digitally stored color values $R_0$, $G_0$, $B_0$ can be read out. The storage addresses are applied to the address line of the RAM 48 from the storage readout addresses and the storage addresses via a multiplexer 50, depending on whether readout or storage is to be effected. In FIG. 2, the multiplexer 50 and the storage in and readout from a R/W (read/write) input of the RAM 48 are controlled by a readout pulse which is applied by the system control circuit 10 when the color vales $R_0$, $G_0$, $B_0$ are to be read out.

The simultaneous presence of readout and read-in addresses at the RAM 48 is prevented in the circuit shown in FIG. 2 in that the color value signals for the display, $R_0$, $G_0$, $B_0$, are read out synchronously with the controlling of the image point by means of the swiveling mirror 40 and polygon mirror 38. However, storage in the RAM 48 is not effected directly. Rather, the color value signals to be stored and the storage addresses are stored in a FIFO (first in, first out) storage 52 when so initiated by a storage signal.

The storage signal is also present at a forward counting input of a forward-backward counter 54 which keeps track of the quantity of stored data in the FIFO storage 52.

The contents of the FIFO storage 52 are only written into the RAM 48 when no readout pulse is present. External clock signals serve to transfer the storage contents from the FIFO storage 52 to the RAM 48. These external clock signals are applied to a readout input of the FIFO storage 52 via gates 55 and 56 only when there is no readout pulse for the RAM 48 and the forward-backward counter 54 shows, via a NOR gate 58, that data are present in the FIFO storage. The forward-backward counter 54 is reset via the clock during the readout of the FIFO storage.

Thus, the entered data for the color value signals $R_i$, $G_i$, $B_i$ are entered asynchronously via a clock. For this purpose, the clock frequency must be substantially higher than the clock rate for storing the color values R, G, B in the video system. The higher the clock rate, the less storage space is required in the FIFO storage 52.

Figure 3:
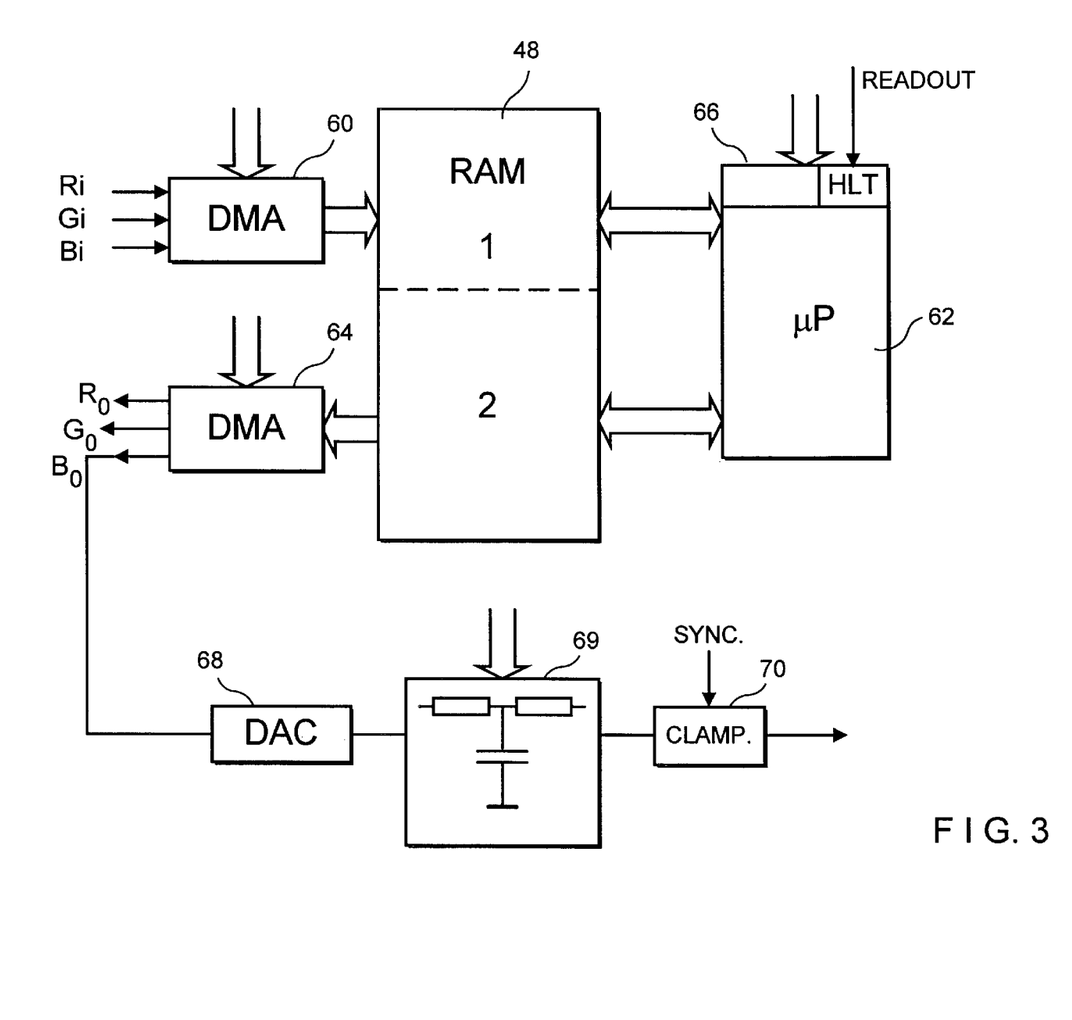
FIG. 3 shows an image storage in which signal processing is carried out by means of a video processor.

FIG. 3 shows a different solution to the problem of synchronization. For this purpose, the RAM 48 has two storage areas 1 and 2 or can be formed of two different storages with different addresses. The color value signals $R_i$, $G_i$, $B_i$ are stored in RAM area 1 via a DMA module 60 and transferred to RAM area 2 by means of a processor 62. The color value signals can be read out of RAM area 2 again via a DMA module 64. In general, DMA modules such as those designated by 60 and 64 are adapted to an associated processor 62 in a data processing system so as to avoid the risk of synchronizing problems such as those described with reference to FIG. 2. However, in the case of time-critical response, it may be necessary when reading out of the storage area 2 to put the microprocessor in a holding state by means of the readout pulse as indicated by the readout arrow at the input HLT of processor 62.

In addition to the simplified synchronization with standard modules in FIG. 3, the processor 62 also provides the advantage that the data for displaying the image can be processed, for example, by applying algorithms to the data for determining intermediate lines or increasing resolution. For this purpose, data words are read in by the system control circuit 10 via a port 66 of the processor 62, which data words instruct the processor 62 to carry out the selected algorithm for data conversion and data transfer from RAM area 1 to RAM area 2.

Under time-critical transfer conditions, an individual processor 62 may be too slow, so that a series of parallel processors 62 are used for accessing different storage areas corresponding to various segments of the image.

Using the example of the read-out color value signal $B_0$, FIG. 3 further shows how this color value signal can be further processed after being read out of the RAM 48. The digital color value signal $B_0$ is first converted to an analog signal via a DAC 68 and is then guided via a low-pass filter 69. The low-pass filter 69 serves to suppress possible high-frequency interference in the analog signal, e.g., originating from the intermediate frequency of a tuner. However, it also performs another function in that it smoothes the square analog values from the DAC 68 and takes the mean of successive color values for image points over a time interval given by the low-pass filter 69. That is, given a suitable design of the low-pass filter 69, algorithms can be dispensed with by means of the processor 62 for adapting to a smaller quantity of image points per line for display relative to the quantity of image points in the stored video image. Therefore, an algorithm to be carried out by the processor 62 for averaging image points within a line can be dispensed with, which accelerates the transfer of data from RAM area 1 to RAM area 2. The low-pass filter 69 is then advisably adjustable to different time constants by the system control circuit 10, e.g., in that different capacitors are switched on in the low-pass filter 69 via analog switches. However, a time shift in the signal maximum is also caused by the low-pass filter 69 so that the time constant of the low-pass filter 69 should be taken into account when adjusting the delay circuit 46 by means of the system control circuit 10.

In the event that it is desirable to take an average of a plurality of image points via the low-pass filter 69, the time constant of the low-pass filter 69 is advisably selected so as to be proportional to the lowest number between the time per image point with respect to the parameter sets for storage and readout in the ROM 18, since the information content of an image can also not be increased by higher resolution on the one hand and, on the other hand, only the information contents given by the resolution of the second parameter set for display is to be displayed. A selectable factor with respect to the cutoff frequency of the low-pass filter 69 also makes it possible to provide a varying degree of smoothing, which corresponds to different interpolations between image points within a line to be displayed.

As a result of the charging of capacitors in the low-pass filter 69, the black-level porch can be shifted from one line to another in the video picture. For this reason, a clamping circuit 70 is provided in the following, which clamping circuit 70 pulls the output signal to zero before the line signal obtained in this way is sent to the control device 14 for further processing. Clamping by means of the clamping circuit 70 is effected via the line synchronizing signal for the image to be displayed.

For the purpose of reading the color value signals into and out of the RAM 48, the DMA modules 60 and 64 can be programmed by the control circuit 10, as is indicated by the wide arrows at modules 60 and 64. This can be carried out directly in some DMA modules, while in others the programming is effected via data lines leading to the processor. In the latter case, the values for programming must be read in via the control circuit 10 by way of a port 66 of the microprocessor 62 which then transfers these values to the DMA modules 60, 64.

The time response shown in FIG. 3 is substantially determined by the processor times of the processor 62. At very high frequencies of up to 20 MHz in HDTV, the example according to FIG. 3 can be realized by means of processors which operate in parallel because of the excessive slowness of currently available processors with respect to transfer for complex algorithms and high frequencies based on the second set of parameters. However, this requires substantial investment.

Figure 4:
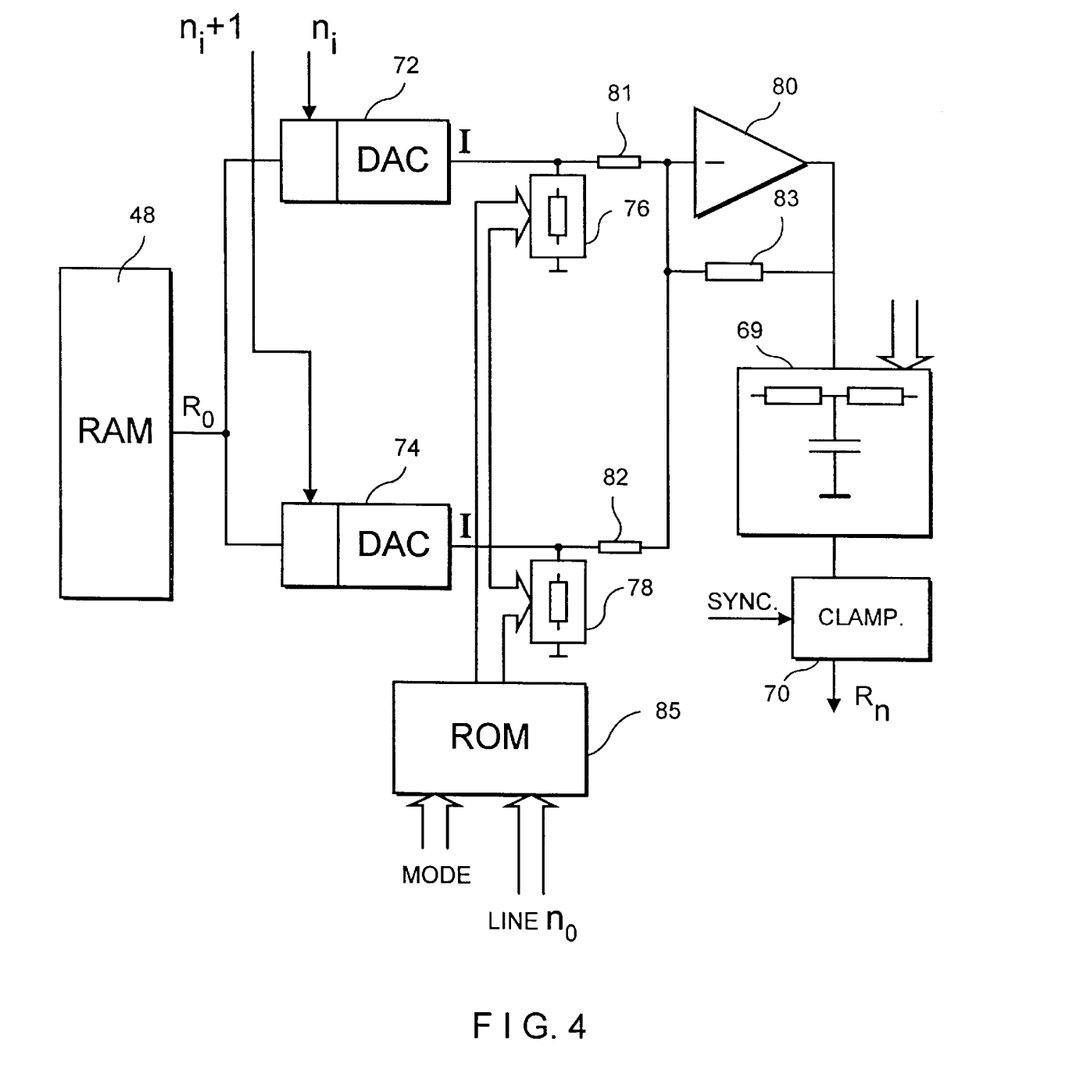
FIG. 4 shows a circuit with an image storage in which the color values for the displayed image points are processed in analog fashion.

FIG. 4 shows a simpler example in which a processor for data processing can be dispensed with. The red color value signal Ro is used by way of example to illustrate the data processing shown in this figure, this red color value signal $R_0$ being read out of a RAM 48 designed according to FIG. 2. The same circuit can be used for the other color value signals. For the sake of a better understanding of the operation, it will be assumed in the following that a line $n_0$ is generated whose color value signal is given by weighted summation of the color value signals of two lines $n_i$ and $n_{i+1}$ of the image which is read into the image storage. Intermediate lines can also be generated by weighted summation if the number of lines of the image to be shown is greater than the number of lines of the image which is read into the image storage. More than two lines can also be summed with a circuit according to FIG. 4. However, for the sake of simplicity, the circuit is illustrated only for two lines $n_i$ and $n_{i+1}$.

After addressing via the system control circuit 10, two color values of image points, one for line $n_i$ and one for line $n_{i+1}$, are read out of the RAM 48 in each instance and stored in digital-to-analog converters 72, 74 which are provided with input buffers. The digital-to-analog converters 72, 74 have a current output at which an output current is generated in proportion to the stored digital value. The output currents of the digital-to-analog converters 72 and 74 bring about a voltage drop at adjustable resistors 76 and 78. Adjustable resistors can be realized, for instance, by connecting resistors via digitally controllable analog switches, wherein the switching elements may be field-effect transistors.

The respective voltage drop at the adjustable resistors 76 and 78 is summed via an operational amplifier 80 which is designed with resistors 81, 82, 83 in a manner which is known from the prior art. Thus, there occurs at the output of the operational amplifier 80 a voltage for the red color value signals of the line $n_0$ to be displayed, formed of color values of the stored image points of lines $n_i$ and $n_{i+1}$ of the operational amplifier 80, which color values are weighted in accordance with the values of the adjustable resistors 76 and 78. In this way, the intermediate line $n_0$ is interpolated from lines $n_i$ and $n_{i+1}$. For this purpose, the digital values for weighting are read out of a ROM 85 which is addressable with the digital value for the line $n_0$ to be read out. Thus, different weights can be adjusted via the ROM 85 for the different framewise position of line $n_0$ in the image relative to the input lines $n_i$ and $n_{i+1}$ so that a circuit of this type can also be used in the case of non-integral multiples of the lines of the stored image with respect to the read-out image. Further, the ROM 85 is addressed by the system control circuit 10 with a data word, designated as "Mode", so that different storage areas in the ROM can be addressed. Different types of interpolation can be determined by means of the data word by selecting the utilized weights. The data word "Mode" is formed depending on the ratio of output lines to be displayed to the number of lines in the stored image.

Further, the circuit in FIG. 4 again shows a low-pass filter 69 and a clamping circuit 70, so that an average may be taken over a plurality of image points in a line by means of the low-pass filter 69 without shifting the black level, as was already described in detail with reference to FIG. 3.

Thus, the processing of data in accordance with a circuit shown in FIG. 4 permits interpolation of the color value signals of lines with respect to image points located one above the other with reference to the frame and following consecutively in time. However, in the case of more complex algorithms, image points lying on the diagonals of an image are usually also taken into consideration. Such algorithms can also be realized by a circuit according to FIG. 4 when color value signals of image points which are offset with respect to time are stored at the input side in the additional digital-to-analog converter and are summed via additional adjustable resistors and additional resistors at the input of the operational amplifier 80. Thus, the added expenditure on circuitry for taking into account more than two image points in the linewise calculation with reference to FIG. 4 is minor so that complex algorithms can also be realized by means of such a construction.

While the foregoing description and drawings represent the present invention, it will be obvious to those skilled in the art that various changes may be made therein without the departing from the true spirit and scope of the present invention.

We claim:

1. In a video system for displaying a video picture composed of image points, whose color values and/or brightness values are stored sequentially, according to a first set of parameters with predetermined parameter values containing number of lines, number of image points, line frequency and frame frequency as parameters, in an image storage which can be read out in accordance with a second set of parameters with different or identical parameter values for the parameters for displaying the stored video picture by a display device, an improvement comprising that:

said display device contains an individual light source which is controlled in accordance with the color values and/or brightness values of the image points and having an associated light bundle;

an optical system for projecting said light bundle onto a picture screen, said optical system having a raster scanning device by which said light bundle can be directed onto said picture screen on optional points within an image field for displaying a video picture of suitable dimensions; and a raster control being provided for said raster scanning device for rastering said light bundle in accordance with the second set of parameters; and wherein the image storage includes a digital storage for storing the color values and/or brightness values of the image points, and the digital storage includes a priority circuit which, in the event of simultaneous addressing for storing information in storage locations and for reading information out of storage locations, gives priority to the addressing for readout, temporarily stores the address for storage as well as the information to be stored, and only stores this information in the storage when the readout is concluded.

2. The video system according to claim 1, wherein the raster scanning device has mirrors for deflecting the light bundle.

3. The video system according to claim 2, wherein the mirrors are constructed as at least one of rotating mirrors and swiveling mirrors.

4. The video system according to claim 1, wherein the image storage can be acted upon by synchronizing pulses for at least one of the start of the line and the start of the frame from the raster control for the readout of the video picture.

5. The video system according to claim 4, wherein the synchronizing pulses of the raster control are capable of being generated prior in time to the start of each line which is given by the raster control by a time interval determined by the maximum memory delays, and a delay circuit is provided for adapting the synchronizing signals to the actual delay time.

6. The video system according to claim 1, wherein the quantity of available storage locations in the digital storage is greater than or equal to the number of required storage locations for storing the color values and/or brightness values multiplied by the maximum number of displayable image points, and the available storage locations for the color information and/or brightness information are freely addressable.

7. The video system according to claim 6, wherein an image processing device, is provided which interpolates the image points, in accordance with the second parameter set for display, from the brightness values and/or color values of the stored video picture when the number of image points and/or the number of lines in the first parameter set differs from that in the second parameter set.

8. The video system according to claim 7, wherein a second storage area is provided in which brightness values and/or color values which are interpolated by the image processing device are stored for readout for the display device.

9. The video system according to claim 7, wherein more than one line is able to be read into the image processing device from the image storage, wherein the color values and/or brightness values of the image points of the lines which are read in are adapted to being subjected to analog summation in a weighted manner for generating a line for display.

10. In a video system for displaying a video picture composed of image points, whose color values and/or brightness values are stored sequentially, according to a first set of parameters with predetermined parameter values containing number of lines, number of image points, line frequency and frame frequency as parameters, in an image storage which can be read out in accordance with a second set of parameters with different or identical parameter values for the parameters for displaying the stored video picture by a display device an. improvement comprising that:

said display device contains an individual light source which is controlled in accordance with the color values and/or brightness values of the image points and having an associated light bundle;

an optical system for projecting said light bundle onto a picture screen, said optical system having a raster scanning device by which said light bundle can be directed onto said picture screen on optional points within an image field for displaying a video picture of suitable dimensions; and a raster control being provided for said raster scanning device for rastering said light bundle in accordance with the second set of parameters;

wherein an image processing device is provided which interpolates the image points, in accordance with the second parameter set for display, from the brightness values and/or color values of the stored video picture when the number of image points and/or the number of lines in the first parameter set differs from that in the second parameter set; and, wherein a low-pass filter is provided in the image processing device, said low-pass filter having a cutoff frequency which is given by a predetermined factor multiplied by the smallest product of image point/line times the line frequency with respect to both sets of parameters.

11. The video system according to claim 10, wherein a clamping circuit is provided downstream of the low-pass filter.

12. The video system according to claim 10, wherein a circuit is provided for color adaptation for different signal definitions for color values and/or brightness values in the parameter sets for storage and readout.

13. The video system according to claim 12, wherein said image processing device is a video processor.

* * * * *